(12) United States Patent
Kim (10) Patent No.: US 12,246,864 B2
(45) Date of Patent: Mar. 11, 2025

(54) DRONE HAVING MOVABLE PROPELLER SHAFT

(71) Applicant: In Heon Kim, Seoul (KR)

(72) Inventor: In Heon Kim, Seoul (KR)

(*) Notice: Subject to any disclaimer, the term of this patent is extended or adjusted under 35 U.S.C. 154(b) by 0 days.

(21) Appl. No.: 18/693,384

(22) PCT Filed: Jul. 18, 2022

(86) PCT No.: PCT/KR2022/010431
§ 371 (c)(1),
(2) Date: Mar. 19, 2024

(87) PCT Pub. No.: WO2023/106538
PCT Pub. Date: Jun. 15, 2023

(65) Prior Publication Data
US 2024/0286776 A1 Aug. 29, 2024

(30) Foreign Application Priority Data
Dec. 9, 2021 (KR) .......................... 10-2021-0175811

(51) Int. Cl.
*B64U 30/296* (2023.01)
*B64U 50/23* (2023.01)
*B64U 10/13* (2023.01)

(52) U.S. Cl.
CPC ........... *B64U 30/296* (2023.01); *B64U 50/23* (2023.01); *B64U 10/13* (2023.01)

(58) Field of Classification Search
CPC ........ B64U 50/23; B64U 50/19; B64U 10/13; B64U 30/20; B64U 20/40; B64U 30/296; B64C 27/54; B64C 27/37; B64D 45/00
See application file for complete search history.

(56) References Cited

U.S. PATENT DOCUMENTS 9,527,588 B1 * 12/2016 Rollefstad .............. B64U 10/13
9,878,786 B2 * 1/2018 Chan ...................... B64D 27/40
(Continued)

FOREIGN PATENT DOCUMENTS

KR         10-1675250 B1    11/2016
KR    10-2018-0027914 A      3/2018
(Continued)

OTHER PUBLICATIONS

EEWeb, Design Fundamental for Drone Motor Controller Digital Design, https://www.eeweb.com/design-fundamentals-for-drone-motor-controller/, pp. 1-13 Jan. 8, 2021.

*Primary Examiner* — Benjamin P Lee
(74) *Attorney, Agent, or Firm* — KORUS Patent, LLC; Seong Il Jeong (57) ABSTRACT

The present invention relates to a drone having a movable propeller shaft, the drone comprising: a drone body having an opening formed thereon; a plurality of propeller shafts arranged radially on the drone body, each propeller shaft having one side portion passing through the opening of the drone body to be disposed inside the drone body and a propeller housing equipped with a propeller and a propeller motor; adjustment means disposed on the drone body, linked to the plurality of propeller shafts, respectively, and configured to adjust the respective angles and heights of the plurality of propeller shafts; a sensor for sensing a rotation angle of each of the plurality of propeller shafts; and a motor driver connected to each propeller, a current check circuit for determining whether current flow is normal, an MCU for transmitting and receiving signals in connection with the current check circuit and transmitting signals to the motor driver, and a main controller connected to the MCU through a wireless communication method.

4 Claims, 12 Drawing Sheets

(56) References Cited

U.S. PATENT DOCUMENTS

| | | | |
|---|---|---|---|
| 9,902,491 B2* | 2/2018 | Chan | B64C 27/54 |
| 9,919,797 B2* | 3/2018 | Chan | B64D 27/402 |
| 12,151,807 B1* | 11/2024 | Kaiser | B64C 29/0008 |
| 2016/0159471 A1* | 6/2016 | Chan | B64D 27/402 |
| | | | 244/39 |
| 2016/0340028 A1 | 11/2016 | Datta | |
| 2019/0152596 A1 | 5/2019 | Kim et al. | |
| 2022/0332413 A1* | 10/2022 | Rallings | B64C 25/36 |

FOREIGN PATENT DOCUMENTS

| | | | |
|---|---|---|---|
| KR | 101865038 B1 * | 6/2018 | B64C 27/08 |
| KR | 102057663 B1 * | 2/2021 | B64C 39/024 |
| KR | 102219272 B1 * | 2/2021 | B64C 39/024 |
| WO | 2016/012876 A1 | 1/2016 | |
| WO | WO-2016089882 A1 * | 6/2016 | B64C 13/02 |
| WO | 2016/148368 A1 | 9/2016 | |
| WO | 2019/116101 A1 | 6/2019 | |

* cited by examiner

DRONE HAVING MOVABLE PROPELLER SHAFT

TECHNICAL FIELD

The present invention relates to a drone having a movable propeller shaft, and more specifically, to a drone having a movable propeller shaft that maintains the flight stability and flight sustaining property of a multi-axis drone equipped with a plurality of propeller shafts.

BACKGROUND ART

A multicopter refers to a flying vehicle that flies in the sky using multiple rotors. Recently, it has generally been used in a similar sense to a drone.

Here, drone is a general term for unmanned aerial vehicles with no on-board crew or passengers. Drones, which are generally controlled by radio waves, were first used militarily for practice intercepting air force aircraft, anti-aircraft guns, or missiles.

As wireless technology gradually developed, it came to be used not only for interception practice, but also for destroying target facilities, equipped with military reconnaissance aircraft and various weapons.

An attack drone generally has a similar shape to a fighter jet. The attack drone has a configuration in which, instead of a propeller, a pair of large lifting wings are arranged on both sides in the middle of the body, and a pair of tail wings that control the direction of the drone is arranged like a general fighter jet.

Of course, among attack drones, there are forms where multiple propellers are arranged in a radial direction like multicopters, and can freely maneuver in any direction.

Such wing-shaped or multicopter-shaped drones are used for purposes such as reconnaissance or bomb-dropping.

Recently, the use of drones has become more widespread. Small drones have been developed and used for leisure purposes, and the popularity of drones is gradually expanding to the extent that drone piloting competitions are held. And, the delivery industry is also planning and implementing a delivery mechanism using drones to transport ordered products.

In line with such trends, major companies around the world regard the drone-related industry as a promising new business and are pushing forward with investment activities and technological development.

A generally commercialized multicopter-type drone, which is a type of drone, has multiple propellers arranged in the radial direction of the drone body with the drone body as a reference. Typically, drones equipped with 4, 6 and 8 propellers are becoming popular.

In the case of such a propeller-driven drone, a plurality of propellers generate lift to maintain the flight balance of the drone body and ensure flight stability.

However, if an abnormality occurs with a specific propeller and the rotation speed is not normal, or if it does not operate due to a malfunction, in most cases the drone will lose flight stability and fall down.

Drones that fall to the ground are subjected to impact, and many of them are damaged. At this time, expensive drones require a lot of drone repair costs, and if the damage is severe, the drone cannot be repaired, and thus, the purchase cost becomes a loss as it is.

Therefore, there is a need in the technical field for a technical solution that can maintain the flight stability of a drone in order to prevent it from crashing, even if an abnormality or malfunction occurs in some of the plurality of propellers in a propeller-driven drone.

Therefore, the present inventor has applied for Korean Patent Application No. 10-2020-0110006 entitled "Drone capable of adjusting the position of the propeller shaft and its control method."

The prior art patent relates to a drone capable of adjusting the position of the propeller shaft, which can maintain flight stability and flight sustaining property by adjusting the positions of other propellers even if normal operation is impossible due to abnormalities or failures in some of the plurality of propellers.

DETAILED DESCRIPTION OF THE INVENTION

Technical Problem

It is an object of the present invention to improve Korean Patent Application No. 10-2020-0110006, which is an earlier application invention by the present inventor. Specifically, it is an object of the present invention to provide a drone which can perform the movement of the propeller axis more stably in multi-axis drones, and thus can move the axis of the propeller so as to maintain flight stability and flight sustaining property by adjusting the position of the propeller, even if an abnormality or malfunction occurs in some of the plurality of propellers and normal operation is impossible.

Technical Solution

In order to achieve the above object, according to the present invention, there is provided a drone having a movable propeller shaft, the drone comprising: a drone body having an opening formed thereon; a plurality of propeller shafts arranged radially on the drone body, each propeller shaft having one side portion passing through the opening of the drone body to be disposed inside the drone body and a propeller housing equipped with a propeller and a propeller motor; adjustment means disposed on the drone body, linked to the plurality of propeller shafts, respectively, and configured to adjust the respective angles and heights of the plurality of propeller shafts; a sensor for sensing a rotation angle of each of the plurality of propeller shafts; and a motor driver connected to each propeller, a current check circuit for determining whether current flow is normal, an MCU for transmitting and receiving signals in connection with the current check circuit and transmitting signals to the motor driver, and a main controller connected to the MCU through a wireless communication method.

According to one embodiment of the present invention, there is provided a drone having a movable propeller shaft in which the adjustment means comprises: a guide structure coupled to the opening of the drone body and provided with a guide hole through which penetrates and couples the propeller shaft; a rotary drive unit formed at the other end of the propeller shaft, including an arc-shaped driven gear and a main drive gear gear-coupled to the driven gear, and comprising a motor installed inside the drone body; a rotation shaft coupled perpendicularly to the interior of the drone, coupled to a propeller shaft, and supporting rotational operation of the propeller shaft; and a control unit that controls the rotation angle of the motor and sets the rotation angle of the driven gear and the propeller shaft.

The guide structure may be formed with a fastener that is fastened to an opening of the drone body.

The fastener may be selected from the group consisting of screws, bolts, pins and rivets.

The guide structure may have the front and rear surfaces formed by flat planes.

The guide structure may have a concave portion formed on the front surface and a convex portion formed on the rear surface.

The guide hole may be formed to be long in the horizontal direction.

The rotation shaft may include a body coupled to a propeller shaft and elastic bodies inserted into both sides of the body, which are respectively coupled to both sides of the body so that the slider is supported by an elastic body, and are in contact with the inner peripheral surface of the guide hole.

The propeller shaft may have a circular or elliptical cross section.

The angle control unit may include a sensor that senses the rotation angle of the driven gear.

According to another embodiment, the adjustment means comprises a guide structure coupled to the opening of the drone body and provided with a guide hole through which penetrates and couples the propeller shaft; a cam and a cam motor in which the propeller shaft is coupled to one side, and the other end is hinge-coupled to a fastener formed inside the drone body to make turning motion, a gearbox equipped with a first gear connected to the cam motor and a second gear geared to the first gear, and a cam drive unit where the output shaft of the second gear is coupled to the cam to subject the cam to turning motion; a pivot unit formed inside the drone body so that the other end of the propeller shaft is hinge-coupled; a rotating shaft formed on the propeller shaft and provided with a slider that contacts the inner peripheral surface of the guide hole and moves along the guide hole when the propeller shaft moves in an arc shape along the trajectory of the cam; and a control unit that controls the rotation angle of the cam motor to set the rotation angle of the second gear and the propeller shaft.

According to one embodiment, the guide structure may include the guide hole, wherein the guide hole may guide the path along which the propeller shaft moves as the propeller shaft penetrates and joins. The guide hole may be designed in a shape to guide the path along which the propeller shaft moves, and the direction or shape of the guide hole and the shape of the guide structure can be designed in various ways to ensure stable movement of the propeller shaft.

The guide hole may be formed in a curved shape.

The curved guide hole may be formed in an upwardly convex shape, and may be formed so as to be inclined downward from the center toward both sides.

The rotation shaft includes a body coupled to the propeller shaft and an elastic body inserted into both sides of the body, and is coupled to both sides of the body so that the slider is supported by the elastic body and is in contact with the inner peripheral surface of the guide hole.

The propeller shaft is characterized in that the cross-section is circular or oval.

An inter bearing coupled to the propeller shaft and supported by the guide hole is included, wherein the inter bearing is coupled to the inside of a bearing housing mounted on the cam so as to be rotatable.

The inter bearing may be a ball bearing or a cylindrical bush.

The control unit may include a sensor that detects the rotation angle of the driven gear.

Advantageous Effects

According to the present invention, the movement of the propeller axis can be performed more stably in a multi-axis drone, whereby even if an abnormality or failure occurs in some of the plurality of propellers and a situation occurs where normal operation is not possible, it is possible to maintain the flight stability and flight sustaining property by adjusting the positions of the other propellers.

Therefore, the present invention can be applied to drone taxis and drone delivery, which are expected to be commercialized in the future, and has the effect of protecting people and cargo from the risk of falling.

DETAILED DESCRIPTION OF THE EMBODIMENTS

Hereinafter, embodiments will be described in detail with reference to the accompanying drawings. However, since various changes can be made to the embodiments, the scope of the patent application is not limited by these embodiments. It should be understood that all modifications, equivalents, or alternatives to the embodiments are within the scope of the invention.

Specific structural or functional descriptions of embodiments are disclosed for illustrative purposes only and may be modified and implemented in various forms. Therefore, the examples are not limited to the particular disclosed forms, and the scope of the specification includes modifications, equivalents, or alternatives that fall within the sprit and scope of the disclosure.

Although the terms "first", "second", etc., may be used herein to describe various components, the components should not be limited by these terms. These terms are only used to distinguish one component from another component.

For example, a first component may also be termed a second component and, likewise, a second component may be termed a first component, without departing from the scope of this disclosure.

When a component is referred to as being "connected to" or "coupled to" another component, the component may be directly connected to or coupled to the other component, or one or more other intervening components may be present. In contrast, when a component is referred to as being "directly connected to" or "directly coupled to", there is no intervening component.

The terms used herein are used to simply explain specific example embodiments and are not construed to limit the present disclosure. The singular forms "a", "an", and "the", are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

In addition, when describing with reference to the accompanying drawings, identical components will be assigned the same reference numerals regardless of the reference numerals, and overlapping descriptions thereof will be omitted. In describing the embodiments, a detailed explanation of known related technologies may be omitted to avoid unnecessarily obscuring the subject matter of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In the embodiments of the present invention, unless otherwise defined, all terms used herein, including technical or scientific terms, have the same meaning as those commonly understood by a person of ordinary skill in the technical field to which the present invention pertains. Terms defined in commonly used dictionaries should be construed as having meanings consistent with the contextual meanings of the relevant art, and unless explicitly defined in the embodiments of the present invention, ideally or should not be construed in an overly formal sense.

The shapes, sizes, ratios, angles, numbers, etc. disclosed in the drawings for explaining the embodiments of the present invention are illustrative, and the present invention is not limited to the details shown. In addition, in explaining the present invention, if it is determined that a detailed explanation of known related technology may unnecessarily obscure the gist of the present invention, a detailed explanation will be omitted. In cases that "comprising," "having," "consisting," etc. are mentioned herein, other parts may be added unless "only" is used. The term of the component used in the singular can also include plural components.

In describing elements, they are interpreted as including error margins even without explicit statements.

When the description of the positional relationship between two parts includes 'on', 'over', 'under', 'beside', etc., one or more parts may be positioned between the two parts unless "right" or "direct" is used.

As used herein, a phrase "an element A on an element B" refers to that the element A may be disposed directly on the element B and/or the element A may be disposed indirectly on the element B via another element C. Like reference numerals refer to like elements throughout the specification.

The size and thickness of each component shown in the drawings are shown for convenience of explanation, and the present invention is not necessarily limited to the size and thickness of the structure shown.

Characteristics of the various embodiments of the present invention may be partially or fully coupled to or combined with each other and may be technically variously linked and driven, and each of the embodiments may be performed independently with respect to each other and be carried together in relation with each other.

Figure 1:
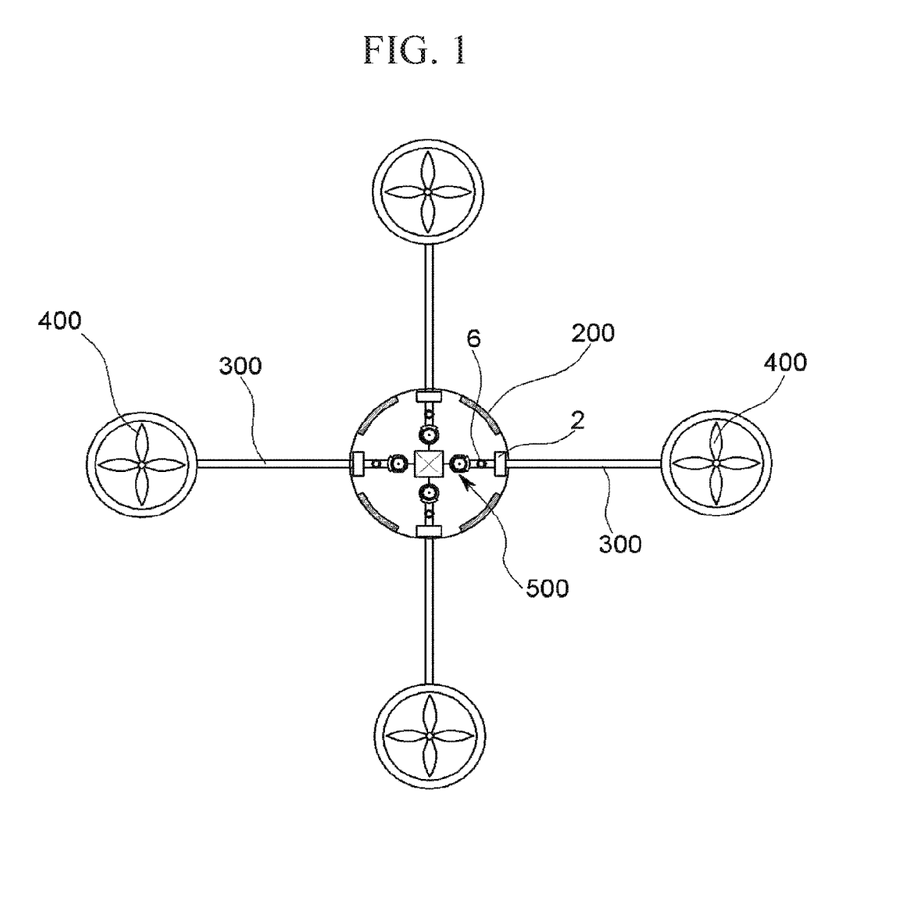
FIG. 1 is a plan view illustrating with a movable propeller axis according to the present invention.
Figure 2:
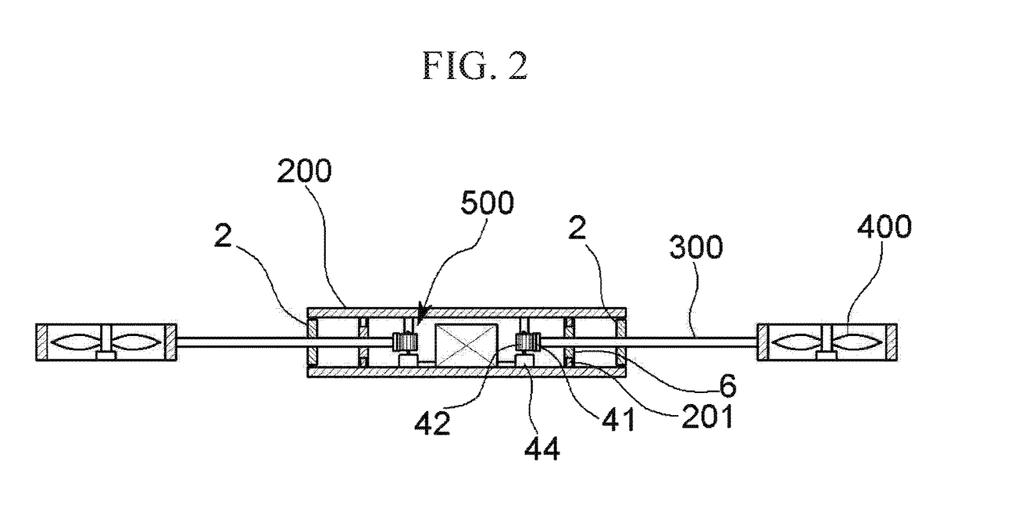
FIG. 2 is a front cross-sectional view illustrating a drone having a movable propeller axis according to the present invention.
Figure 3:
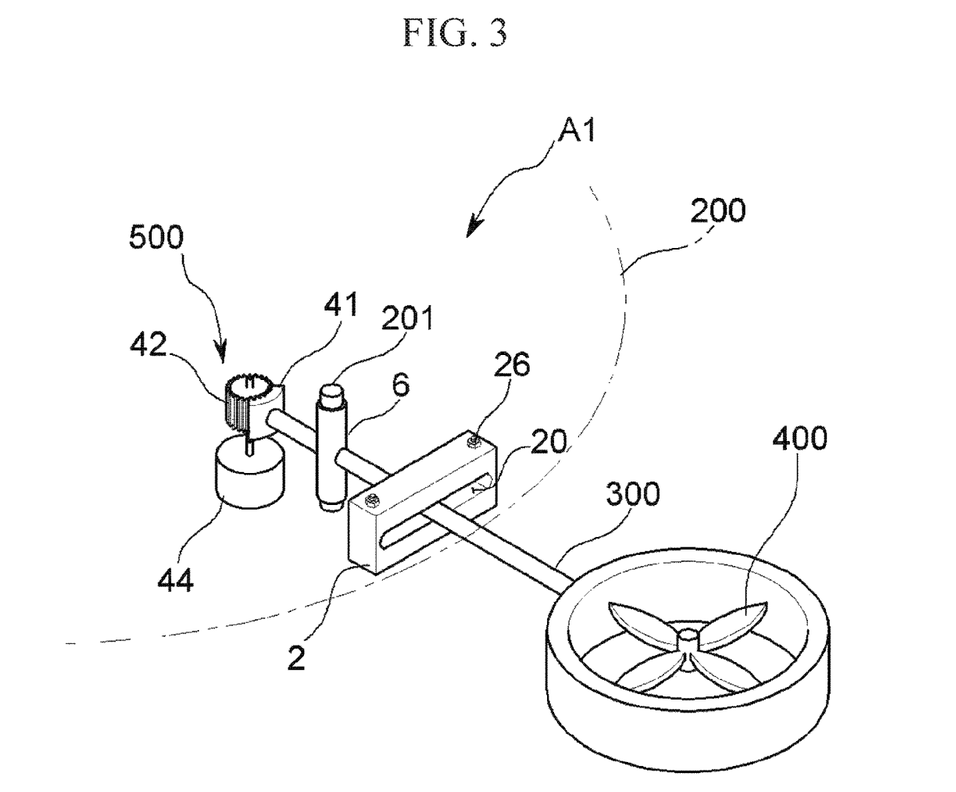
FIG. 3 is a perspective view illustrating the 'adjustment means' according to one embodiment (A1) of the drone having a movable propeller axis according to the present invention.
Figure 4:
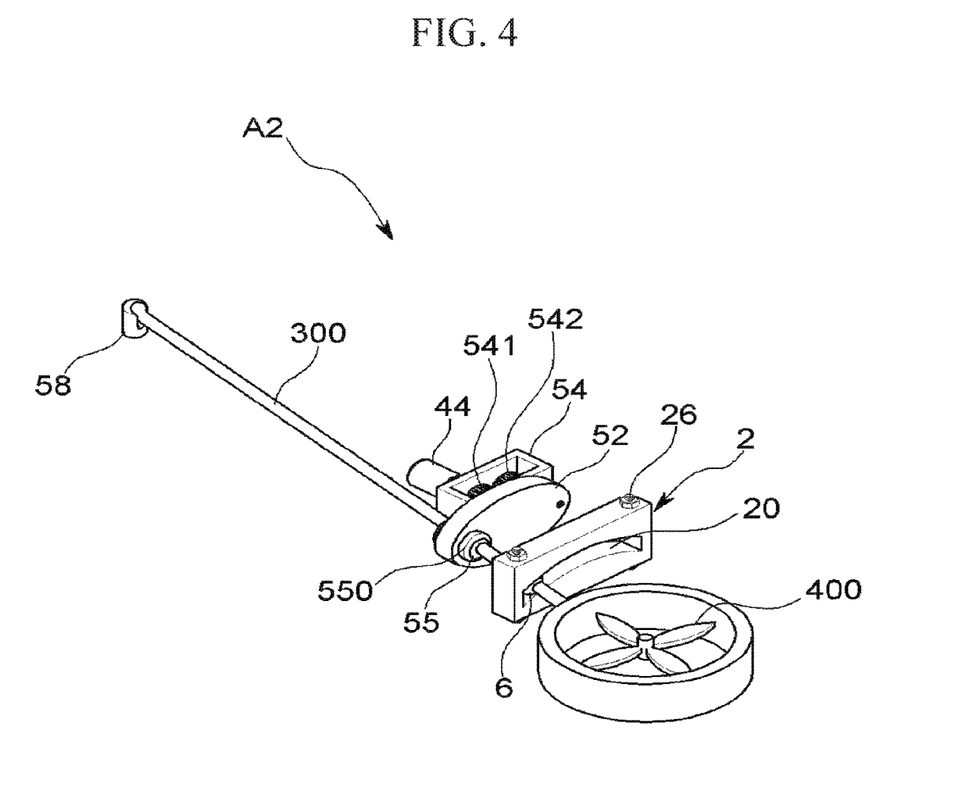
FIG. 4 is a perspective view illustrating the 'adjustment means' according to another embodiment (A2) of a drone having a movable propeller axis according to the present invention.
Figure 5:
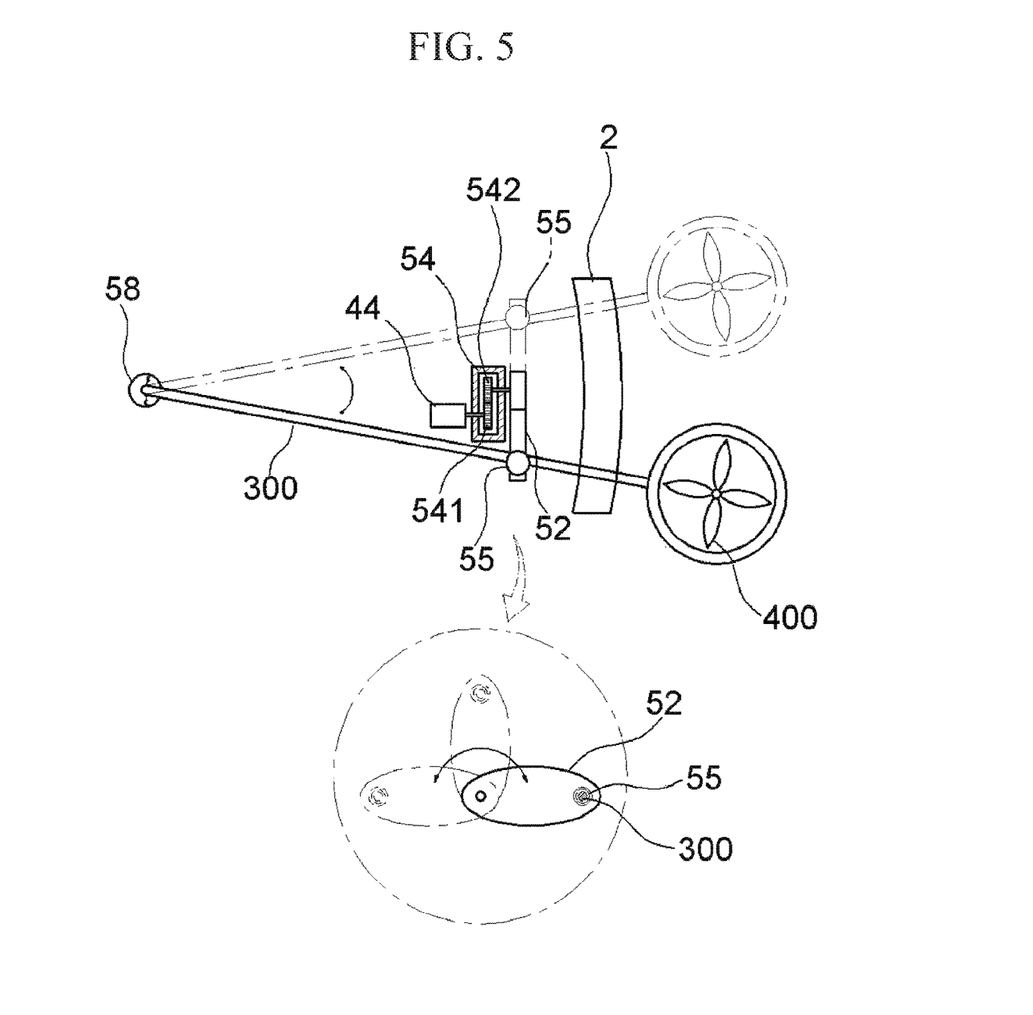
FIG. 5 is a diagram illustrating the cam operation of FIG. 4.
Figure 6A:
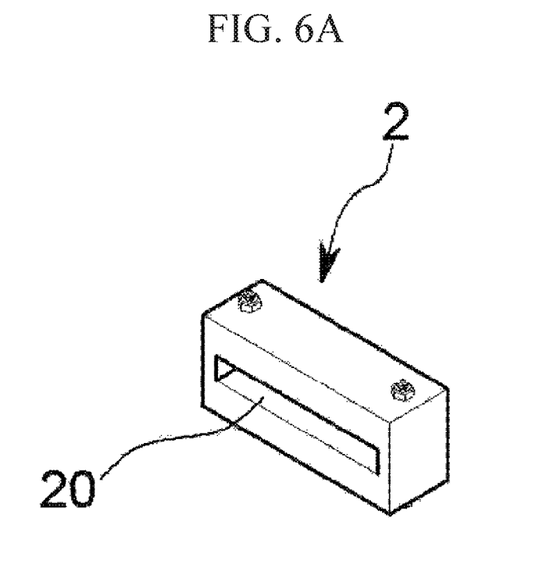
FIGS. 6A-C are diagrams illustrating various shapes of the guide structure in which horizontal guide holes are formed in the present invention.
Figure 6B:
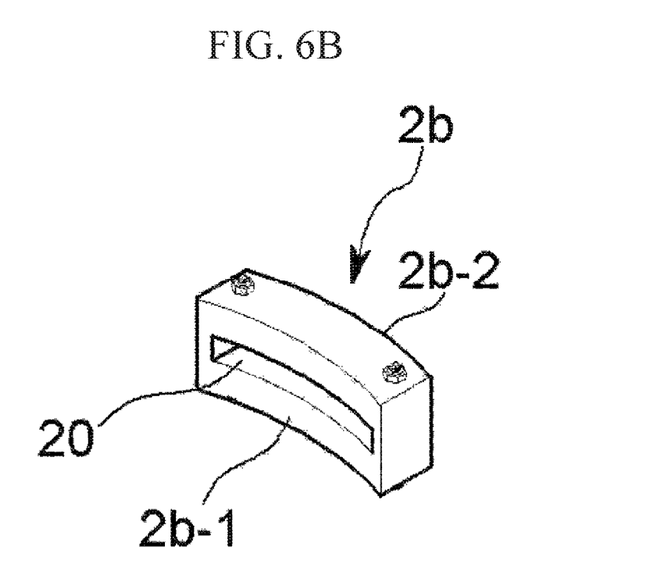
Figure 6C:
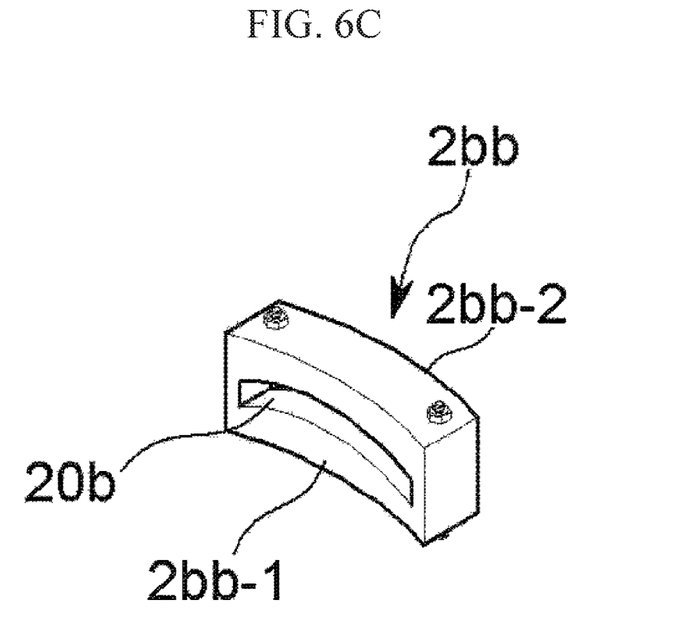
Figure 7A:
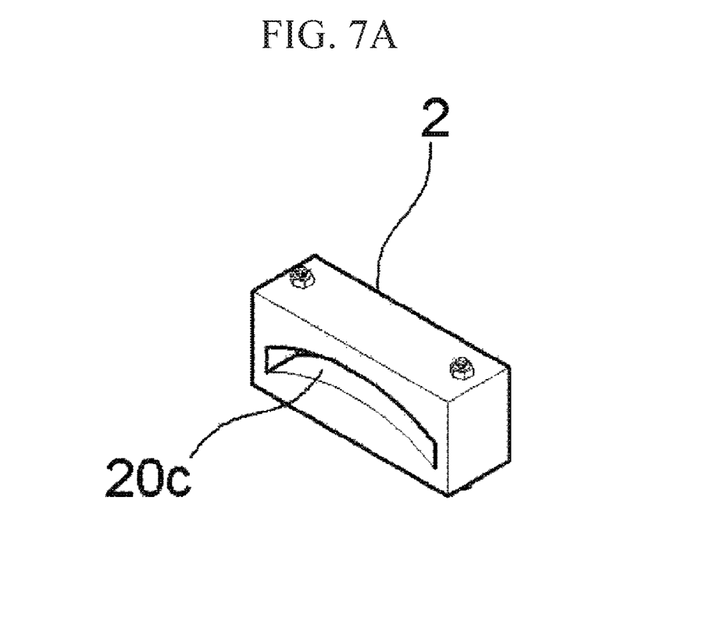
FIGS. 7A-B are diagrams illustrating a guide structure in which arc-shaped guide holes are formed in the present invention.
Figure 7B:
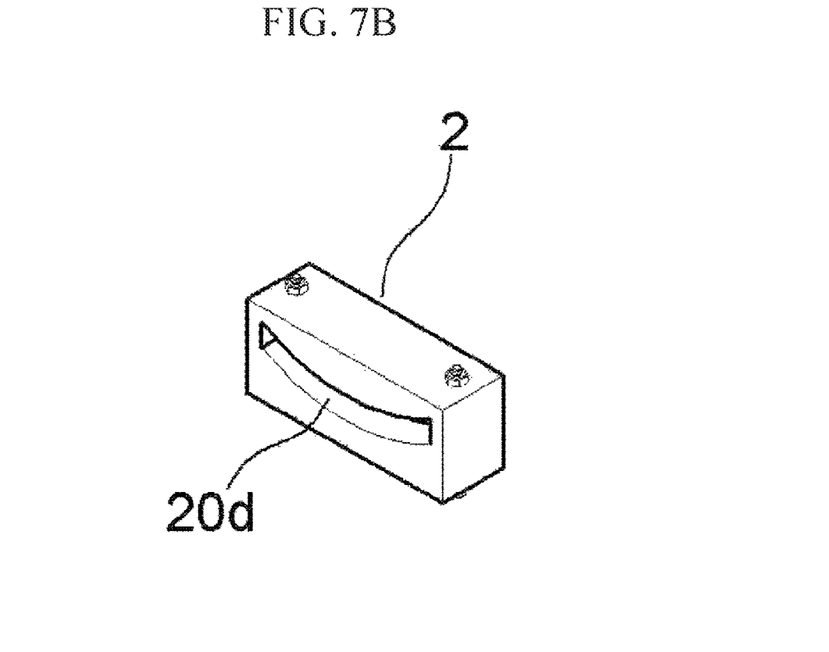
Figure 8A:
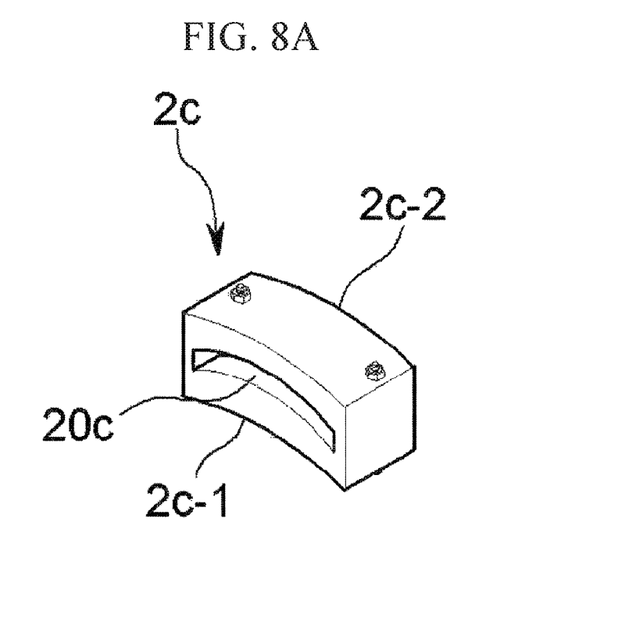
FIGS. 8A-B are diagrams, illustrating a guide structure in which an arc-shaped guide hole is formed and is formed to be convex upward or downward in the present invention.
Figure 8B:
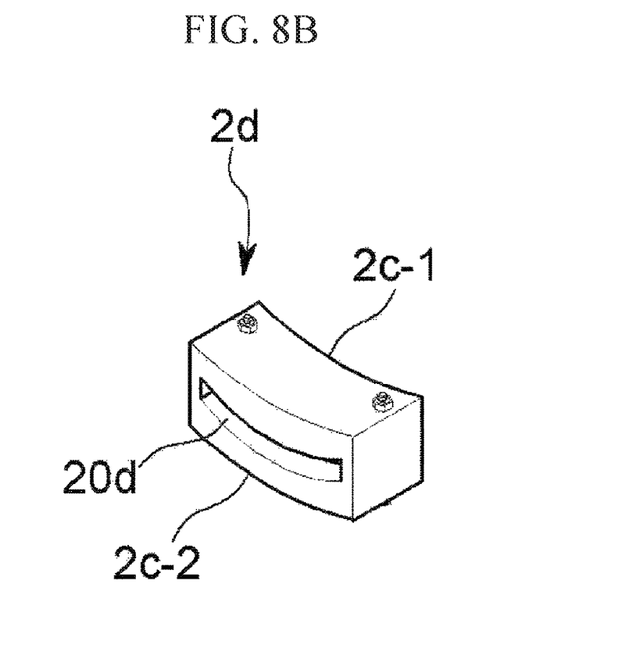
Figure 9:
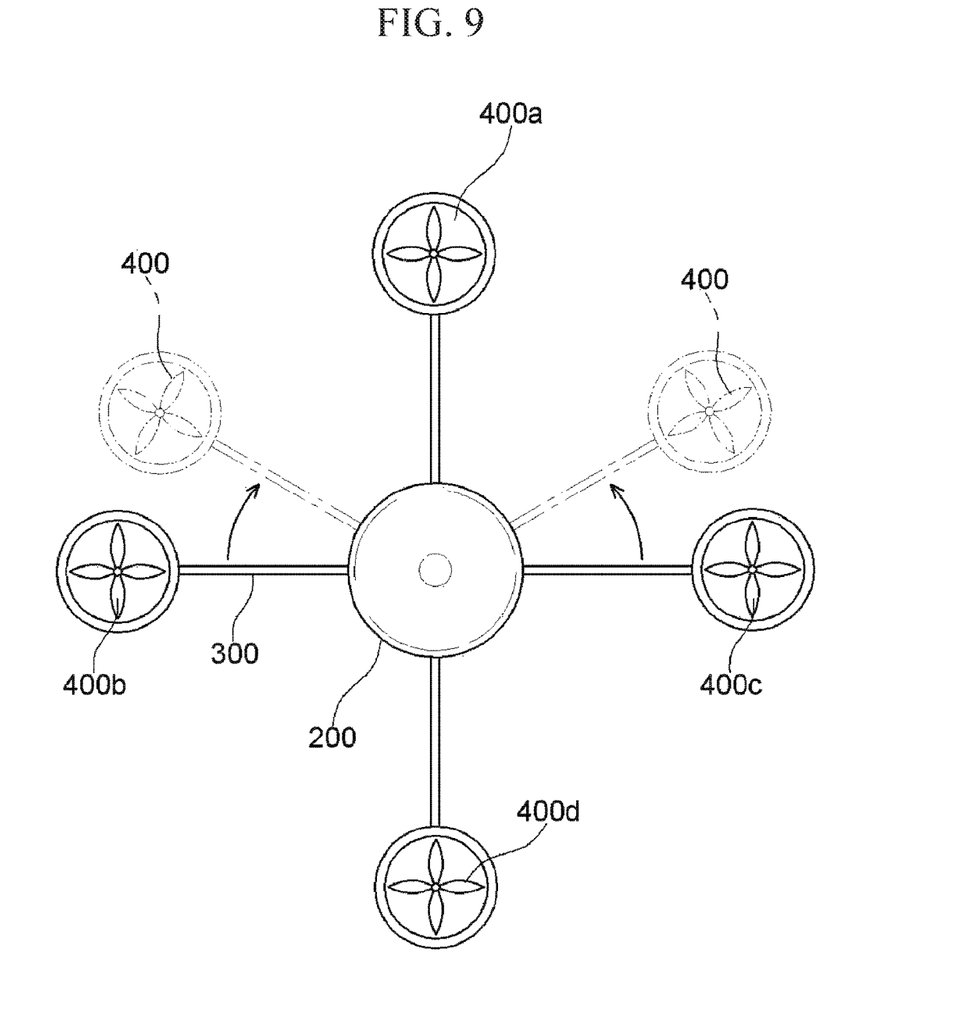
FIG. 9 is a plan view showing an example in which the propeller shaft of the present invention is moved and the position is changed.
Figure 10:
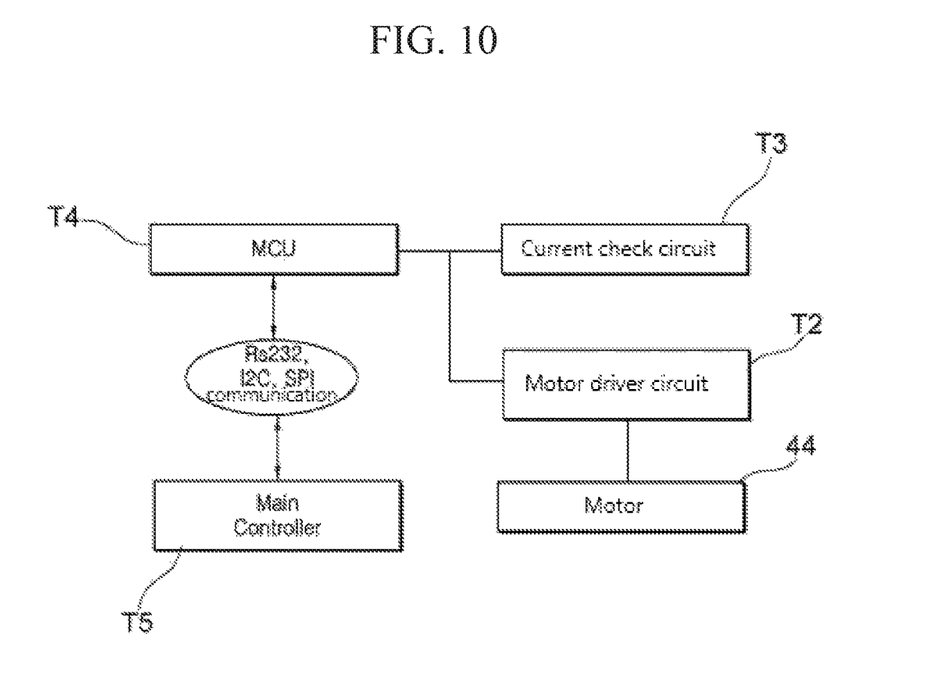
FIG. 10 is a diagram illustrating a configuration including a motor driver that detects the operating state of each propeller motor of the present invention.
Figure 11:
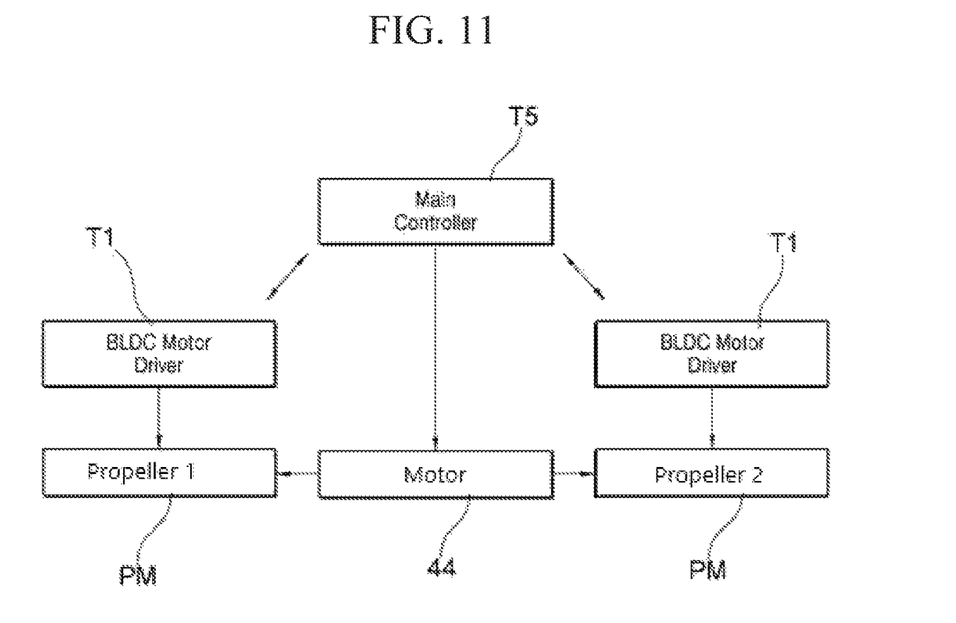
FIG. 11 is a diagram illustrating a configuration for controlling angle adjustment between propeller shafts in the drone of the present invention.

Among the accompanying drawings, FIG. 1 is a plan view illustrating with a movable propeller axis according to the present invention. FIG. 2 is a front cross-sectional view illustrating a drone having a movable propeller axis according to the present invention. FIG. 3 is a perspective view illustrating the 'adjustment means' according to one embodiment (A1) of the drone having a movable propeller axis according to the present invention. FIG. 4 is a perspective view illustrating the 'adjustment means' according to another embodiment (A2) of a drone having a movable propeller axis according to the present invention. FIG. 5 is a diagram illustrating the cam operation of FIG. 4. FIGS. 6A-C are diagrams illustrating various shapes of the guide structure in which horizontal guide holes are formed in the present invention. FIGS. 7A-B are diagrams illustrating a guide structure in which arc-shaped guide holes are formed in the present invention. FIGS. 8A-B are diagrams, illustrating a guide structure in which an arc-shaped guide hole is formed and is formed to be convex upward or downward in the present invention. FIG. 9 is a plan view showing an example in which the propeller shaft of the present invention is moved and the position is changed. FIG. 10 is a diagram illustrating a configuration including a motor driver that detects the operating state of each propeller motor of the present invention. FIG. 11 is a diagram illustrating a configuration for controlling angle adjustment between propeller shafts in the drone of the present invention.

A drone having a movable propeller shaft according to the present invention includes a drone body 200 having an opening formed thereon; a plurality of propeller shafts 300 arranged radially on the drone body 200, each propeller shaft 300 having one side portion passing through the opening of the drone body 200 to be disposed inside the drone body 200 and the other side portion being equipped with a propeller 400; and adjustment means disposed on the drone body 200, linked to the plurality of propeller shafts 300, respectively, and configured to adjust the respective angles and heights of the plurality of propeller shafts 300.

A certain space is formed inside the drone body 200 so that the adjustment means 500 can be placed therein, and a plurality of openings are formed along the outer periphery.

Depending on the number of propeller shafts 300, they are classified into 4-axis for 4 propeller shafts, 6-axis for 6 propeller shafts, and the like.

In the disclosed description, four axes will be mainly described.

One side of the propeller shaft 300 may pass through the opening 210 of the drone body 200, and be disposed inside the drone body 200. At this time, the propeller shaft 300 is connected to the adjustment means 500 inside the drone body 200, and the propeller 400 is mounted on the other side portion of the propeller shaft 300.

The adjustment means is provided for each propeller shaft 300, and each adjustment means can rotate each propeller shaft 300 to adjust and set the distance between the plurality of propeller shafts 300.

For example, if any one of the four propellers 400 is fixed, the three normally operating propeller shafts 300 can move their positions to maintain proper theta (θ) value, thereby stably sustaining flight.

Embodiment 1

The adjustment means according to the first embodiment will be explained.

As shown in FIGS. 3 and 4, according to one embodiment (A1), the adjustment means 500 comprises:
- a guide structure 2 coupled to the opening of the drone body 200 and formed with a guide hole 20 in the horizontal direction;
- a propeller shaft 300 coupled through the guide hole 20 of the guide structure 2, wherein one end is formed with a propeller housing equipped with a propeller 400 and the other end is inserted into the drone body 200;
- a rotary drive unit 4 formed at the other end of the propeller shaft 300, and comprising an arc-shaped driven gear 41 and a main drive gear 42 gear-coupled to the driven gear 41, and a motor 44 installed inside the drone body 200;
- a rotation shaft 6 that is vertically coupled to the interior of the drone body 200, penetrated and coupled to the propeller shaft 300, and supports the rotational operation of the propeller shaft 300;
- a control unit that controls the rotation angle of the motor 44 and sets the rotation angle of the driven gear 41 and the propeller shaft 300.

The guide structure 2 has a generally hexahedral shape, has guide holes 20 penetrating through both ends, and is provided with a fastener 26 that is detachably fastened to the opening of the drone body 200.

The fastener 26 may be selected from the group consisting of screws, bolts, pins, and rivets.

Therefore, by drawing the fastener 26 into the guide structure 2 so that it is spaced apart from the opening of the drone body 200, the guide structure 2 can be separated from the drone body 200 by being separated from the opening of the drone body 200. On the contrary, by pulling out the fastener 26 to the outside of the guide structure 2, it can be fastened and fixed to the opening of the drone body 200.

As shown in FIG. 6A, the guide structure 2 has a rectangular parallelepiped shape with a flat front and back surface. The guide hole 20 is formed to be long in the horizontal direction.

As shown in FIG. 6B, the guide structure 2b has a concave portion 2b-1 formed on the front surface and a convex portion 2b-2 formed on the rear surface. The guide hole 20 is formed to be long in the horizontal direction.

As shown in FIG. 6C, the guide structure 2bb has a concave portion 2bb-1 formed on the front side and a convex portion 2bb-2 formed on the back side, and the guide hole 20b is formed in an upwardly convex shape and is formed so as to be inclined downward from the center toward both sides.

The curved guide structures 2b and 2bb are formed in an arc shape so as to be able to equally match the curvature of the circular drone body 200.

Referring to FIGS. 3 and 4, a through hole is formed in the rotating shaft 6 so that the propeller shaft 300 passes through the central part, and fitting holes are formed in the upper and lower portions.

Therefore, the bosses 201 formed on the upper and lower inner surfaces of the drone body 200 are respectively coupled to the fitting holes on both sides.

The control unit may include a sensor (not shown) that detects the rotation angle of the driven gear 41.

By sensing the rotation angle of the driven gear 41, the sensor can calculate the angle at which the propeller shaft 300 has rotated and guide accurate rotation.

It is preferable that the propeller shaft 300 is basically rod-shaped with a circular cross section.

Alternatively, the propeller shaft 300 may be rod-shaped with an oval cross section to increase bending rigidity.

Embodiment 2

On the other hand, as shown in FIGS. 4 and 5, according to another embodiment (A2), the adjustment means 500 comprises,
- a guide structure 2 coupled to the opening of the drone body 200 and formed with a guide hole 20 in the horizontal direction;
- a cam 52 and a cam motor 44 in which the propeller shaft 300 is coupled to one side, and the other end is hinge-coupled to a fastener formed inside the drone body 200 to make turning motion, a gearbox 54 equipped with a first gear 541 connected to the cam motor 44 and a second gear 542 gear-coupled to the first gear 541, and a cam drive unit 5 where the output shaft of the second gear 542 is coupled to the cam 542 to subject the cam 52 to turning motion;
- a pivot unit 58 formed inside the drone body 200 so that the other end of the propeller shaft 300 is hinge-coupled;
- a rotating shaft 6 formed on the propeller shaft 300 and is provided with a slider 66 that contacts the inner peripheral surface of the guide hole 20 and moves along the guide hole 20 when the propeller shaft 300 moves in an arc shape along the trajectory of the cam 52; and
- a control unit that controls the rotation angle of the cam motor 44 to set the rotation angle of the second gear 542 and the propeller shaft 300.

The guide hole 20 is formed in a curved shape to be suitable for rotational driving of the cam 52.

As shown in FIG. 7A, the curved guide hole 20c is formed in an upwardly convex shape, and is formed so as to be inclined downward from the center toward both sides.

As shown in FIG. 7B, the curved guide hole 20d may be formed in a downward convex shape and may be formed to be inclined upward from the center toward both sides.

Alternatively, as shown in FIG. 8A, the guide structure 2c has a concave portion 2c-1 formed on the front side, a convex portion 2c-2 formed on the rear side, and a curved type guide holes 20c and 20d formed through the front and rear surfaces.

As shown in FIG. 8B, the guide structure 2*d* has a convex portion 2*c*-2 formed on the front side, a concave portion 2*c*-1 formed on the rear side, and a curved guide hole 20*c* and 20*d* formed through the front and rear surfaces.

The guide structure 2 formed with such concave portions and convex portions is formed to match the curvature of the drone body 200 when it is circular.

The propeller shaft 300 may have a circular or oval cross section 300*b*. Since this is substantially the same as the above-mentioned first embodiment, a detailed description thereof will be omitted.

Meanwhile, referring to FIG. 4, an inter bearing 55 coupled to the propeller shaft 300 and supported by the guide hole 20 is included.

The inter bearing 55 is coupled to the inside of the bearing housing 550 mounted on the cam 52 and can be rotated in conjunction with the up-down rotation and left-right rotation of the propeller shaft 300.

According to one embodiment, the inter bearing 55 may be a ball bearing or a cylindrical bush.

The operation of the control unit will be described with reference to FIG. 11.

The motor driver T1 detects the operating state of each propeller motor PM.

The motor driver circuit T2 is connected to each propeller motor PM and is provided with a current check circuit T3. The MCU (T4) is linked to the current check circuit T3 to determine whether the current flow is normal or not, transmits and receives signals in response thereto, and further transmits the determined signal to the motor driver circuit T2.

The MCU T4 is connected to the main controller T5 via a wireless communication method.

Therefore, the operating state of the motor 44 is checked using voltage or current to determine whether there is an abnormality or not, and information regarding this is transmitted to the main controller T5.

As the wireless communication method, RS232, I2C, SPI, etc. are applied.

Further, the operation of the control unit will be explained with reference to FIGS. 10 and 11. In the drone of the present invention, the angle adjustment between the propeller shafts 300 is controlled.

The drone include a BLDC motor driver T1 connected to each propeller motor PM,
  each propeller motor PM is connected to a motor 44 that is an adjustment means that controls the propeller direction.

Each BLDC motor driver T1 and the motor 44 of the adjusting means are connected to the main controller T5, and the motor 44 is constantly checked for errors (occurrence of abnormality).

When an abnormal state of the propeller shaft 400*a* is detected from the BLDC motor driver T1, the motor 44 of the adjustment means for the other propellers 400*b*, 400*c* is driven, the angle of the propeller shaft 300 is reset, and the three propellers 400*b*, 400*c*, and 400*d* are adjusted to have an equal angle, thereby maintaining the flight attitude stably (see FIG. 9).

Although specific embodiments of the present invention have been described above in more detail with reference to the accompanying drawings, the present invention is not necessarily limited to such embodiments, and various modifications may be made without departing from the technical idea of the present invention. Therefore, the embodiments disclosed in the present invention are not intended to limit the technical idea of the present invention, but are for illustrative purposes only, and the scope of the technical idea of the present invention is not limited by such embodiments. Therefore, the embodiments described above should be understood to be illustrative in all respects and not restrictive. The protection scope of the present invention should be interpreted based on the following claims, and all technical ideas within the scope equivalent thereto should be construed as falling within the scope of rights of the present invention.

Therefore, other implementations, other embodiments, and equivalents to the claims also fall within the scope of the following claims.

The invention claimed is:

1. A drone having a movable propeller shaft, the drone comprising:
  a drone body having an opening formed thereon;
  a plurality of propeller shafts arranged radially on the drone body, each propeller shaft having one side portion passing through the opening of the drone body to be disposed inside the drone body and a propeller housing equipped with a propeller and a propeller motor;
  adjustment means disposed on the drone body, linked to the plurality of propeller shafts, respectively, and configured to adjust the respective angles and heights of the plurality of propeller shafts;
  a sensor for sensing a rotation angle of each of the plurality of propeller shafts; and
  a motor driver connected to each propeller, a current check circuit for determining whether current flow is normal, an MCU for transmitting and receiving signals in connection with the current check circuit and transmitting signals to the motor driver, and a main controller connected to the MCU through a wireless communication method,
  wherein the adjustment means comprises,
  a guide structure coupled to the opening of the drone body and provided with a guide hole through which penetrates and couples the propeller shaft;
  a rotary drive unit formed at the other end of the propeller shaft, including an arc-shaped driven gear and a main drive gear gear-coupled to the driven gear, and comprising a motor installed inside the drone body;
  a rotation shaft coupled to the interior of the drone, coupled to a propeller shaft, and supporting rotational operation of the propeller shaft; and
  a control unit that controls the rotation angle of the motor and sets the rotation angle of the driven gear and the propeller shaft,
  wherein the guide structure is formed with a fastener that is fastened to an opening of the drone body,
  wherein the fastener is selected from the group consisting of screws, bolts, pins and rivets,
  wherein the guide structure has the front and back surfaces formed by flat planes, or has a concave portion formed on the front surface and a convex portion formed on the rear surface, and
  wherein the guide hole is formed to be long in the horizontal direction.

2. A drone having a movable propeller shaft, the drone comprising:
  a drone body having an opening formed thereon;
  a plurality of propeller shafts arranged radially on the drone body, each propeller shaft having one side portion passing through the opening of the drone body to be disposed inside the drone body and a propeller housing equipped with a propeller and a propeller motor;

adjustment means disposed on the drone body, linked to the plurality of propeller shafts, respectively, and configured to adjust the respective angles and heights of the plurality of propeller shafts;

a sensor for sensing a rotation angle of each of the plurality of propeller shafts; and a motor driver connected to each propeller, a current check circuit for determining whether current flow is normal, an MCU for transmitting and receiving signals in connection with the current check circuit and transmitting signals to the motor driver, and a main controller connected to the MCU through a wireless communication method, wherein the adjustment means comprises, a guide structure coupled to the opening of the drone body and provided with a guide hole through which penetrates and couples the propeller shaft;

a cam and a cam motor in which the propeller shaft is coupled to one side, and the other end is hinge-coupled to a fastener formed inside the drone body to make turning motion, a gearbox equipped with a first gear connected to the cam motor and a second gear geared to the first gear, and a cam drive unit where the output shaft of the second gear is coupled to the cam to subject the cam to turning motion;

a pivot unit formed inside the drone body so that the other end of the propeller shaft is hinge-coupled;

a rotating shaft formed on the propeller shaft and provided with a slider that contacts the inner peripheral surface of the guide hole and moves along the guide hole when the propeller shaft moves in an arc shape along the trajectory of the cam; and a control unit that controls the rotation angle of the cam motor to set the rotation angle of the second gear and the propeller shaft, wherein the guide hole of the guide structure is formed to be convex upward and slope downward from the center to both sides, or to be convex and slope upward from the center to both sides.

3. The drone as claimed in claim 1, further comprising:
a guide structure including a guide hole through which the propeller shaft is coupled and which guides a path of movement of the propeller shaft.

4. The drone as claimed in claim 2, further comprising:
a guide structure including a guide hole through which the propeller shaft is coupled and which guides a path of movement of the propeller shaft.

* * * * *